May 4, 1926. 1,583,124
W. T. COFFLAND
LAWN MOWER
Filed March 12, 1925
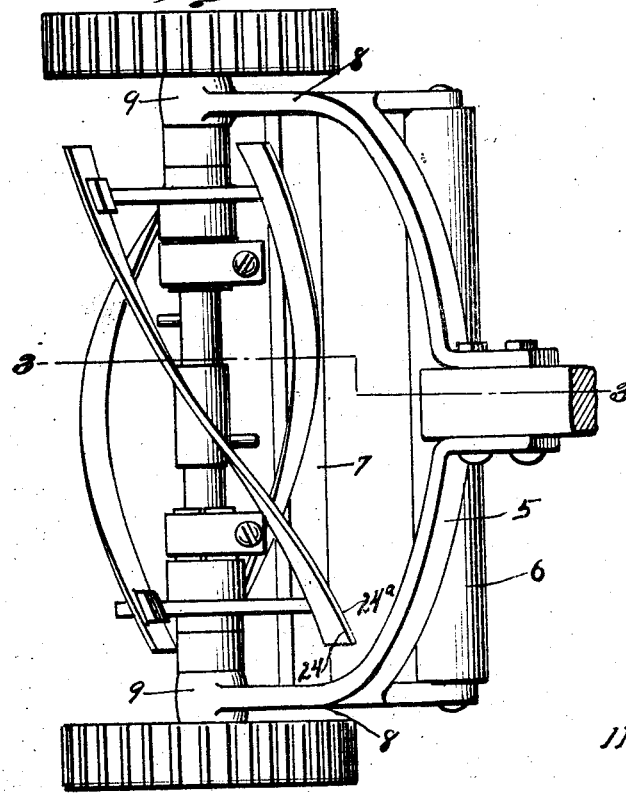
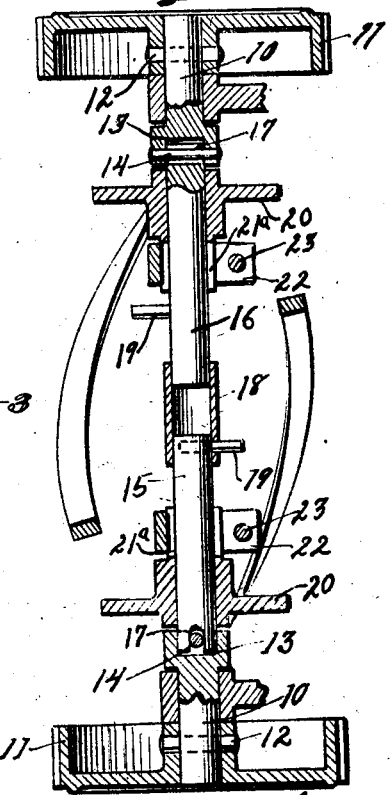
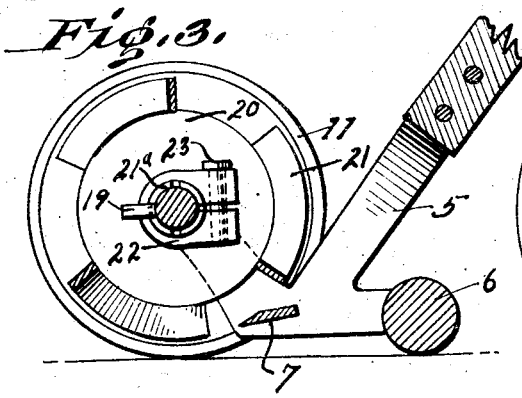
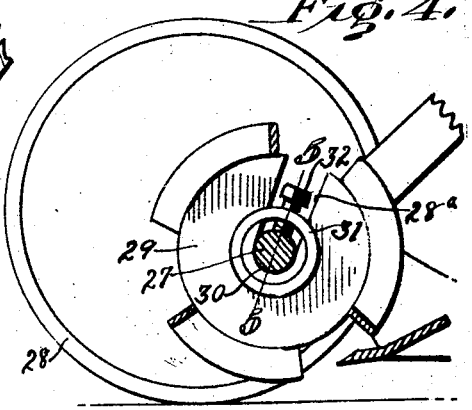
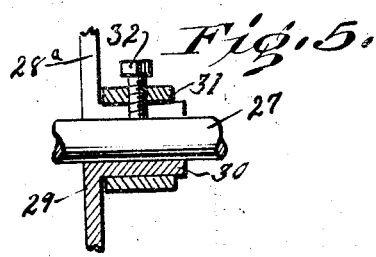
Inventor
William T. Coffland Patented May 4, 1926.

1,583,124

UNITED STATES PATENT OFFICE.

WILLIAM T. COFFLAND, OF VINTON, IOWA.

LAWN MOWER.

Application filed March 12, 1925. Serial No. 15,020.

*To all whom it may concern:*

Be it known that WILLIAM T. COFFLAND, a citizen of the United States, residing at Vinton, in the county of Benton and State of Iowa, has invented certain new and useful Improvements in Lawn Mowers, of which the following is a specification, reference being had therein to the accompanying drawing.

This invention relates to certain new and useful improvements in lawn mowers.

The purpose of the invention is to provide a lawn mower having a reel which is reversible to present either side of the reel blade to the stationary cutter.

A further feature of the invention resides in the provision of novel means for reversibly mounting the reel so that when the cutting edge at one side of the reel blades becomes worn or rounded from continuous use the blades may be reversed end for end to present opposite sides of the cutting edges to the stationary cutter.

Other purposes and advantages of the invention, as well as the characteristic features of construction, combination and arrangement of parts will be more readily understood from the following brief description and accompanying drawings, in which, Figure 1 is a top plan view of a lawn mower constructed in accordance with my invention.

Figure 2 is a longitudinal, sectional view through the structure shown in Figure 1, with certain parts of the frame omitted.

Figure 3 is a transverse sectional view taken on the line 3—3 of Figure 1.

Figure 4 is a view similar to Figure 3 but showing a modification.

Figure 5 is a fragmentary sectional view taken on the line 5—5 of Figure 4.

In these drawings, 5 designates the usual frame carrying the roller 6 and the stationary cutter 7. The arms 8 of the frame terminate in bearings 9 through which extend the axles 10 of the ground or traction wheels 11, said axles and wheels being pinned together as indicated at 12. The inner ends of the axles 10 are provided with sockets 13 in which are received the ends of the reel shaft hereinafter referred to and provided with cross pins 14 adapted to enter recesses in the ends of the reel shaft to form a drive connection between said shaft and the axles.

The reel shaft previously referred to is preferably made in two sections, 15 and 16, formed at the outer ends with notches 17 engageable with the pins 14 as shown to advantage in Figure 4. At its inner end, section 15 is provided with the sleeve 18 in which is slidably received the corresponding end of section 16 whereby the two sections may be moved relatively to one another to increase or decrease the total length of the shaft. Such movement is facilitated by the provision of the handle pins 19. The reel heads 20 are slidably mounted on the sections 15 and 16 and are rigidly connected together by the reel blades 21. In order to lock the shaft sections 15 and 16 in the extended position shown in Figure 4 the heads 20 are provided with split hub extensions 21ª surrounding the shaft sections and adapted to be clamped thereto by means of the split clamp members 22 and the tightening bolts 23.

In the use of this lawn mower and also in the use of the ordinary lawn mower it will be noted that the inner sides or corners 24 of the reel blades are presented to the stationary cutters 7 as the lawn mowers is advanced in the usual manner. After a certain period of use it has been noted that these inner sides or corner portions of the blades become dulled or rounded with the result that in the case of the ordinary lawn mower the reel blades must be resharpened. My invention, however, enables the reel to be removed and reversed end for end so that the opposite sides or corner portions 24ª may be presented to the stationary cutter as the wearing action of each reel blade, due to its cooperation with the stationary cutter, is confined mainly to the side of the blade which is presented to the cutter.

With reference to the form of invention disclosed in Figures 1 to 3 inclusive, I desire it to be understood that the reel shaft bearings have been shown as carried by the axles of the wheels 11 merely for simplicity of illustration as in conformity with prevailing practice such bearings will be mounted independently of the wheels and geared thereto so that the proper ratio with respect to the relative rotation of the wheels 11 and the reel may be obtained.

In Figures 4 and 5, I have disclosed that conventional type of lawn mower including a shaft 27 extending in one continuous length between the wheels 28 and driven therefrom through the usual type of gearing (not shown). For this type of mower I provide a modified reel having slots 28ᵃ formed in the reel heads 29 and leading from the peripheries of the heads to the substantially U-shaped hubs 30 at the inner ends of the slots. In practice, the slotted portions of the heads are slipped over shaft 27 until the latter rests in the bearing 30 and the reel is then secured in position by means of annular collars 31 encircling the hubs 30 and carrying jam screws 32 which are screwed into binding engagement with the shaft 27 as shown in Figure 4. When it is desired to reverse the reel, the screws 32 are loosened and the collars 31 slipped inwardly beyond the bearing 30 thereby enabling the reel to be removed from shaft 27, reversed and reapplied to the shaft subsequent to which the collars 31 are again slipped over the bearings and the screws 32 brought in to binding engagement with the shaft.

While in the foregoing certain elements have been described as best adapted to perform the functions required of them it will be apparent that the use of such elements is not mandatory as various changes in the construction, arrangement and cooperation of the parts may be resorted to within the scope of the appended claim without departing from the spirit of the invention.

What I claim as my invention is:

In a lawn mower, the combination with the stationary cutter, of a removable rotary cutting reel and means for mounting said reel arranged to permit the reel to be reversed end for end so as to present either side of the cutting edges of the reel blade for cooperation with said stationary cutter, said means including the usual reel shaft extending between and driven by the usual ground wheels, said shaft being received in slots formed in the heads of the reel and extending from the periphery to the central portions of said heads, slotted hubs projecting inwardly from the heads at the inner ends of said slots, the slots in said hubs being in line with the slots in said heads, a displaceable ring fitted on each of said hubs and closing the slot therein and a jam screw carried by each of said rings and engaging said shaft, the arrangement being such that on loosening the jam screws and moving the rings inwardly beyond said hubs the reel may be freely removed from the shaft.

In testimony whereof I hereunto affix my signature.

WILLIAM T. COFFLAND.